US008550422B1

(12) United States Patent
Thomas

(10) Patent No.: US 8,550,422 B1
(45) Date of Patent: Oct. 8, 2013

(54) GUTTER GUARD DEVICE

(76) Inventor: Anthony Thomas, Ajax (CA)

( * ) Notice: Subject to any disclaimer, the term of this patent is extended or adjusted under 35 U.S.C. 154(b) by 0 days.

(21) Appl. No.: 13/549,673

(22) Filed: Jul. 16, 2012

(51) Int. Cl.
*F16M 1/00* (2006.01)

(52) U.S. Cl.
USPC .......... 248/615; 248/345.1; 108/27; 182/107; 5/663

(58) Field of Classification Search
USPC ......... 248/48.1, 48.2, 345.1, 615, 210; 5/424, 5/425, 663; 182/214, 206, 107, 108, 105; 108/27, 28; 126/500, 544
See application file for complete search history.

(56) References Cited

U.S. PATENT DOCUMENTS

| | | | | |
|---|---|---|---|---|
| 1,620,933 | A * | 3/1927 | Wilcox | 52/717.01 |
| 1,878,850 | A * | 9/1932 | Hilgers | 108/28 |
| 2,166,798 | A * | 7/1939 | Cote | 264/248 |
| 2,518,107 | A * | 8/1950 | Wilson | 182/194 |
| 2,568,148 | A * | 9/1951 | Goldsmith | 211/153 |
| 2,568,153 | A * | 9/1951 | Hickman | 211/153 |
| 3,041,775 | A * | 7/1962 | Brown, Jr. et al. | 248/345.1 |
| 3,393,933 | A * | 7/1968 | Cornelius | 312/312 |
| 3,634,925 | A * | 1/1972 | Van Loo | 29/458 |
| 4,089,497 | A * | 5/1978 | Miller et al. | 248/345.1 |
| 4,109,887 | A * | 8/1978 | Wakeland, Jr. | 5/678 |
| 4,214,326 | A * | 7/1980 | Spann | 5/632 |
| 4,554,039 | A * | 11/1985 | James | 156/213 |
| 4,580,661 | A | 4/1986 | Thomson, Jr. | |
| 4,582,739 | A * | 4/1986 | Givens | 428/83 |
| 4,813,515 | A | 3/1989 | Wigington | |
| 5,040,684 | A * | 8/1991 | Knowles | 206/586 |
| 5,509,500 | A | 4/1996 | Delagera | |
| 5,639,072 | A * | 6/1997 | McCall | 267/139 |
| 5,813,638 | A * | 9/1998 | Morris | 248/152 |
| 5,867,853 | A * | 2/1999 | Feld | 5/663 |
| 6,019,336 | A * | 2/2000 | Havens | 248/345.1 |
| 6,021,865 | A * | 2/2000 | Thompson et al. | 182/107 |
| 6,076,212 | A * | 6/2000 | Feld | 5/663 |
| 6,321,399 | B1 * | 11/2001 | Walterscheid | 5/118 |
| 6,354,401 | B2 | 3/2002 | Murray | |
| 6,378,831 | B1 * | 4/2002 | Copeland, Jr. | 248/345.1 |
| 6,390,236 | B1 * | 5/2002 | Eastman | 182/107 |
| 6,412,599 | B1 * | 7/2002 | Thompson et al. | 182/107 |
| D461,356 | S * | 8/2002 | Thomas | D6/610 |
| 7,182,993 | B1 * | 2/2007 | Hamilton | 428/100 |
| 7,383,627 | B1 * | 6/2008 | Kinnard et al. | 29/717 |
| 7,770,861 | B2 * | 8/2010 | Huxtable et al. | 248/345.1 |
| 2003/0197105 | A1 * | 10/2003 | Murray | 248/345.1 |
| 2009/0189045 | A1 * | 7/2009 | Peckovich | 248/345.1 |
| 2009/0200445 | A1 * | 8/2009 | Benn | 248/345.1 |
| 2011/0284710 | A1 * | 11/2011 | Wallace et al. | 248/345.1 |

* cited by examiner

*Primary Examiner* — Kimberly Wood

(57) ABSTRACT

A gutter guard device that includes an elongate, curved bracket having a hooked portion disposed at a first edge, a first piece disposed from the first edge, said first piece joining a second piece at an approximately 90 degree first bend, the second piece joined to a third piece at an oblique angle at a second bend, and a rubberlike outer portion disposed overlying an exterior side, whereby the gutter guard device releasably attaches to the lip of an extant gutter to cover a section of a gutter thereby so that the pressure of a ladder rested against the gutter is distributed across a section and the gutter is protected thereunder.

3 Claims, 3 Drawing Sheets

GUTTER GUARD DEVICE

BACKGROUND OF THE INVENTION

Various types of gutter guard devices are known in the prior art. However, what is needed is a gutter guard device including an elongate, curved bracket having a hooked portion disposed at a first edge, a first piece disposed from the first edge, said first piece joining a second piece at an approximately 90 degree first bend, the second piece joined to a third piece at an oblique angle at a second bend, and a rubberlike outer portion disposed overlying an exterior side, whereby the gutter guard device releasably attaches to the lip of an extant gutter to cover a section of the gutter thereby so that the pressure of a ladder rested against the gutter is distributed across said section and the gutter is protected thereunder.

FIELD OF THE INVENTION

The present invention relates to a gutter guard device, and more particularly, to a gutter guard device including an elongate, curved bracket having a hooked portion disposed at a first edge, a first piece disposed from the first edge, said first piece joining a second piece at an approximately 90 degree first bend, the second piece joined to a third piece at an oblique angle at a second bend, and a rubberlike outer portion disposed overlying an exterior side, whereby the gutter guard device releasably attaches to the lip of an extant gutter to cover a section of the gutter thereby so that the pressure of a ladder rested against the gutter is distributed across said section and the gutter is protected thereunder.

SUMMARY OF THE INVENTION

The general purpose of the gutter guard device, described subsequently in greater detail, is to provide a gutter guard device which has many novel features that result in a gutter guard device which is not anticipated, rendered obvious, suggested, or even implied by prior art, either alone or in combination thereof.

As a roofer I have many times ascended a ladder to access a roof or rooftop. Leaning ladders against gutters can cause significant damage and deformation to gutters, creating larger issues subsequently, resulting from decreased drainage and impeded passage of drain water conveyed through the gutter. Most gutters are made of a lightweight material, oftentimes aluminum, for example, which easily bends or deforms under pressure. A way to protect a gutter while leaning a ladder thereto is warranted.

While other gutter guard devices and apparatuses are seen in the prior art, what is needed is a gutter guard device that includes an elongate, curved bracket having a hooked portion disposed at a first edge, a first piece disposed from the first edge, said first piece joining a second piece at an approximately 90 degree first bend, the second piece joined to a third piece at an oblique angle at a second bend, with a rubberlike outer portion disposed overlying an exterior side, whereby the gutter guard device releasably attaches to the lip of an extant gutter to cover a desired section of the gutter so that the pressure of a ladder rested against the gutter is distributed across said section and the gutter is protected thereunder.

The present gutter guard device includes an elongate, curved bracket having an interior side and an exterior side. The interior side is configured to conform to the upper section of a gutter exterior when the gutter guard device is moved to an engaged position upon said gutter. The curved bracket includes a first edge having a hooked portion disposed thereupon. The hooked portion is configured to releasably engage with the lip of the gutter to which the gutter guard device is applied when the gutter guard device is moved to the engaged position. The bracket includes a first piece disposed from the first edge, the first piece connected to a second piece by means of a first bend of approximately 90 degrees. The second piece is connected to a third piece at an oblique angle by means of a second bend. The third piece tapers to a second edge.

A rubberlike outer portion includes a pair of rounded bends and is disposed upon the exterior side of the bracket. The outer portion is disposed parallel the first piece and then widens where it overlies the second piece, proximal the second bend. The outer portion is then disposed parallel the third piece. When the present gutter guard device is moved to the engaged position upon a gutter, the widening of the outer portion where said outer portion overlies the second piece provides a sloped surface against which a ladder may more easily rest. The rubberlike material of the outer portion increases traction to prevent slippage of a ladder placed thereagainst.

A heel is disposed on a lowermost portion of the outer portion, the heel disposed to contact the exterior of the gutter to which the device is attached, when the device is moved to the engaged position. The rubberlike material of the outer portion also prevents the heel from rendering damage to the getter exterior when the device is used.

The preferred embodiment herein disclosed is approximately 66 cm (26 inches) in length. The first piece of the bracket is approximately 3.8 cm (1.5 inches) between the first edge and the first bend, the second piece is approximately 3.8 cm (1.5 inches) between the first bend and the second bend, and the third piece is configured to taper to the second edge with the heel of the outer portion disposed to contact the exterior of a gutter to which the gutter guard device is attached.

Thus has been broadly outlined the more important features of the present gutter guard device so that the detailed description thereof that follows may be better understood and in order that the present contribution to the art may be better appreciated.

Objects of the present gutter guard device, along with various novel features that characterize the invention are particularly pointed out in the claims forming a part of this disclosure. For better understanding of the gutter guard device, its operating advantages and specific objects attained by its uses, refer to the accompanying drawings and description.

BRIEF DESCRIPTION OF THE DRAWINGS

Figures

DETAILED DESCRIPTION OF THE DRAWINGS

With reference now to the drawings, and in particular FIGS. 1 through 4 thereof, example of the instant gutter guard device employing the principles and concepts of the present gutter guard device and generally designated by the reference number 10 will be described.

Referring to FIGS. 1 through 4 a preferred embodiment of the present gutter guard device 10 is illustrated.

Figure 4:
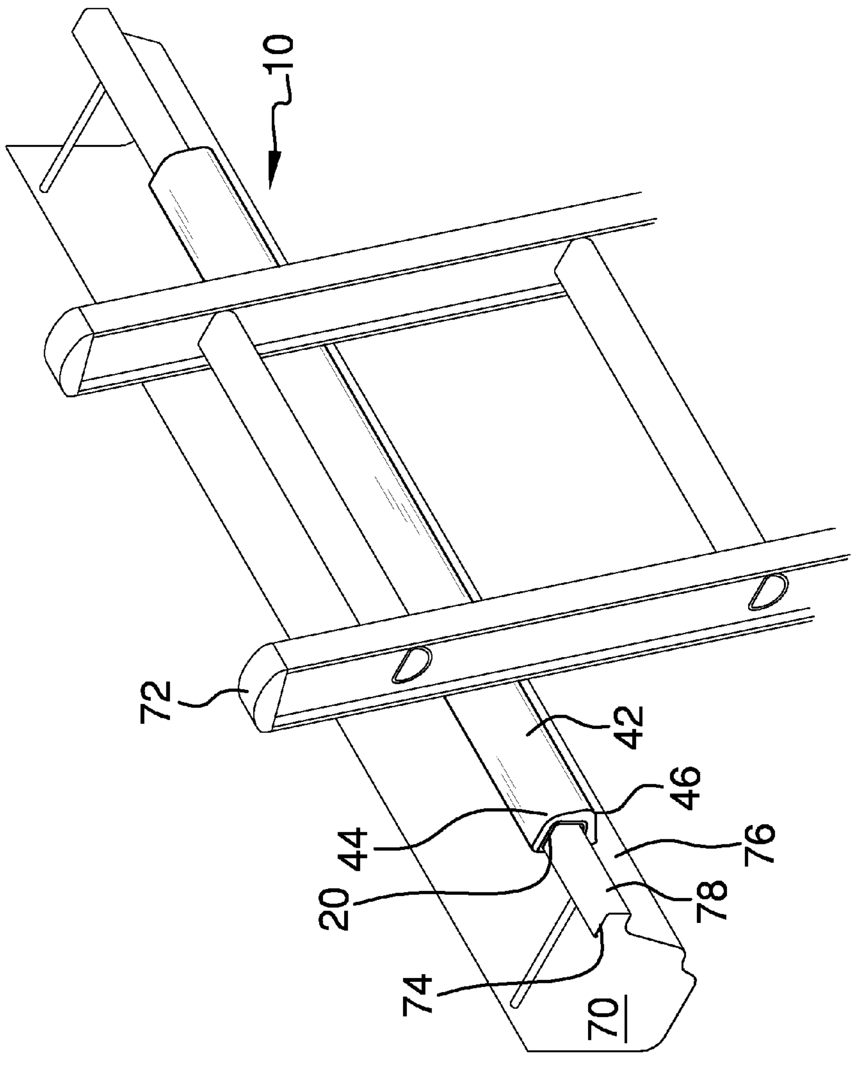
FIG. 4 is an in-use view.

The present gutter guard device 10 has been configured to releasably attach to a gutter 70 to protect said gutter 70 when a ladder 72 is placed thereupon for accessing a roof (see FIG. 4). The present gutter guard device 10 releasably fastens to a lip 74 of an extant gutter 70 and thereat distributes the pressure exerted by a ladder 72 across a section of the extant gutter 70 to prevent damage to the gutter 70 while a person or persons ascend said ladder 72 to gain access to a roof.

The gutter guard device 10 releasably fastens to a gutter 70 and includes an elongate, curved bracket 20 configured to releasably engage with an extant gutter 70. The bracket 20 includes a first edge 22, a first piece 24 disposed from the first end 22, a second piece 26 disposed at approximately 90 degrees with respect to the first piece 24, and a third piece 28 disposed at more than 90 degrees with respect to the second piece 26, the third piece 28 disposed at an oblique angle relative the second piece 26 and tapering therefrom to a second edge 30.

Figure 1:
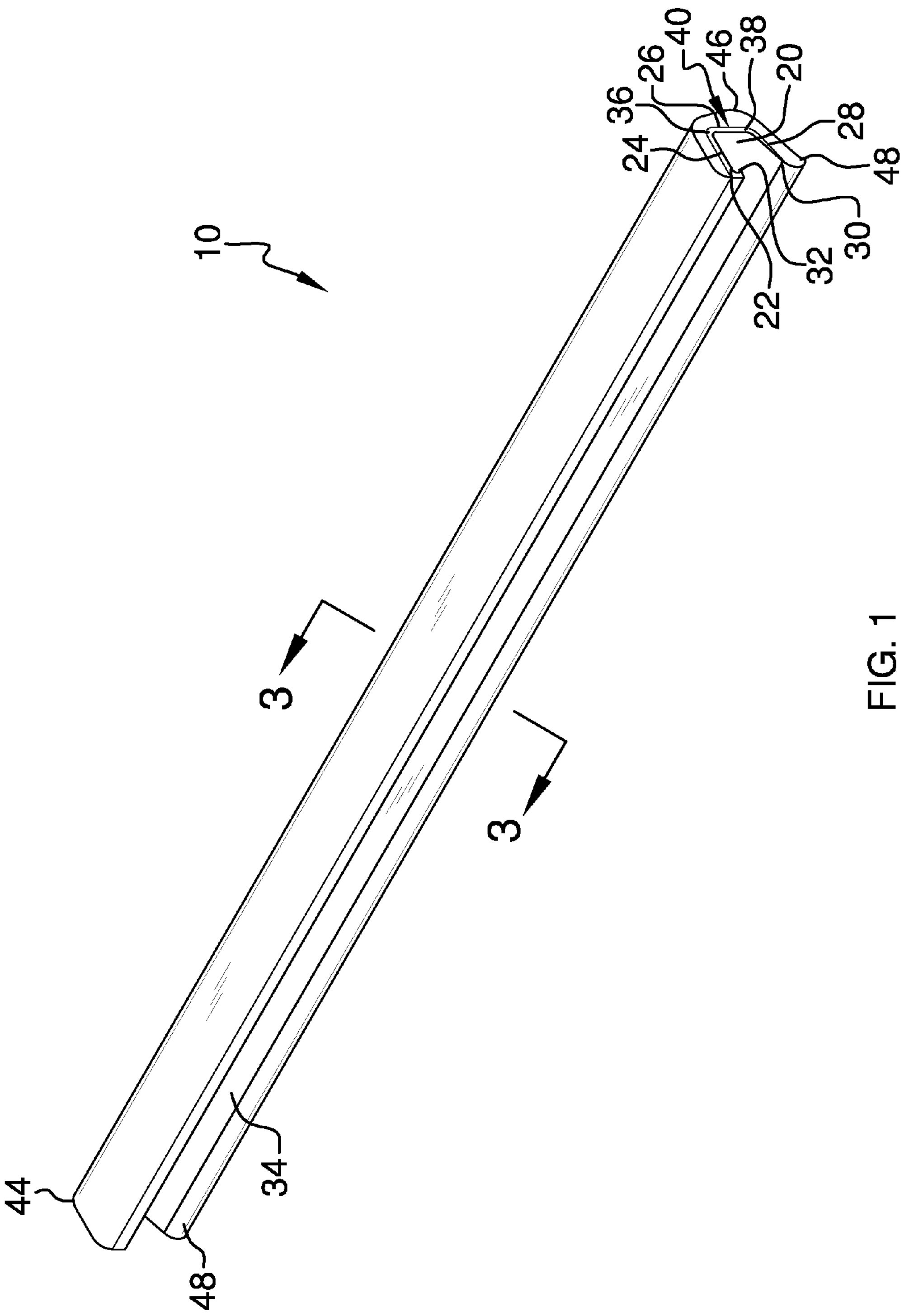
FIG. 1 is an isometric view.
Figure 2:
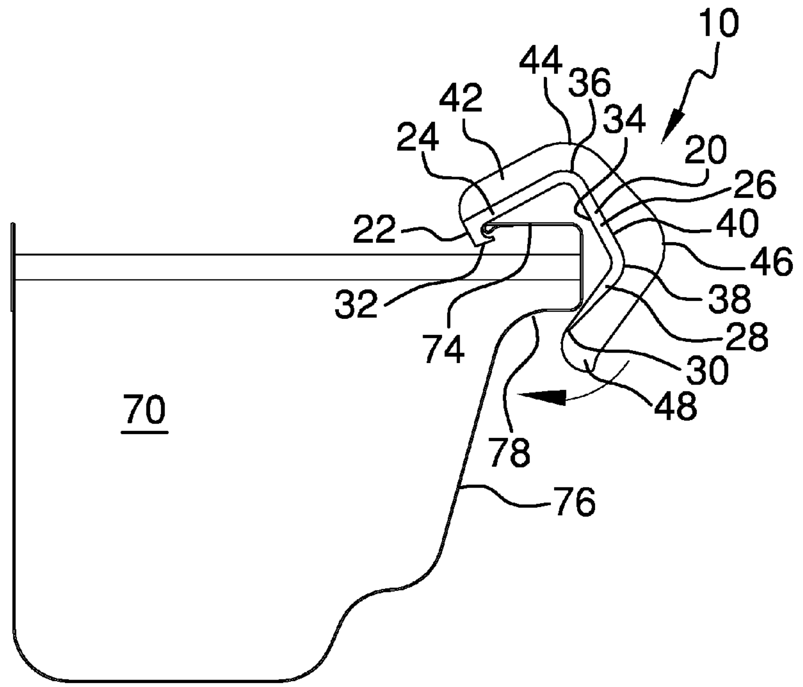
FIG. 2 is a side view.

A hooked portion 32 is disposed upon the first edge 22, said hooked portion 32 disposed to releasably engage with a lip 74 disposed upon said extant gutter 70 (see FIG. 2). An interior side 34 is disposed upon the bracket 20, said interior side 34 configured to mesh with an extant gutter 70 exterior 76 when the hooked portion 32 is releasably engaged with the gutter 70 lip 74, and the gutter guard device 10 is moved to an engaged position (as shown in FIG. 4).

The bracket 20 includes a first bend 36 of approximately 90 degrees and a second bend 38 of more than 90 degrees whereby the interior side 34 conforms with the upper section 78 of an exterior 76 of a gutter 70 when the hooked portion 32 is releasably engaged with the lip 74 of said gutter 70 and the gutter guard device 10 is moved to an engaged position.

An exterior side 40 is disposed upon the bracket 20 outfacing from the gutter 70, when the gutter guard device 10 is moved to the engaged position. A rubberlike outward portion 42 is disposed upon the exterior side 40, said outward portion 42 disposed in continuous contact with the exterior side 40 of the bracket 20 first piece 24. The outward portion 42 has rounded bends 44 and 46 that conform to the respective first bend 36 and second bend 38 of the bracket. Said outward portion 42 is disposed divergently atop the second piece 26, whereby the outward portion 42 thickens towards the bracket 20 second bend 38. The outward portion 42 is disposed in continuous contact with the bracket third piece 28. The outward portion 42 thereby effectively covers the bracket 20 exterior side 40, and when the gutter guard device 10 is releasably engaged with an extant gutter 70, the outward portion 42 is disposed to contact a ladder 72 (as shown in FIG. 4) to provide traction and security to the positioning of the ladder 72. The widening of the outer portion 42 proximal the second bend 38 relative the outer portion 42 proximal the first bend 36 enables a sloped surface against which a ladder 72 may securely rest.

Figure 3:
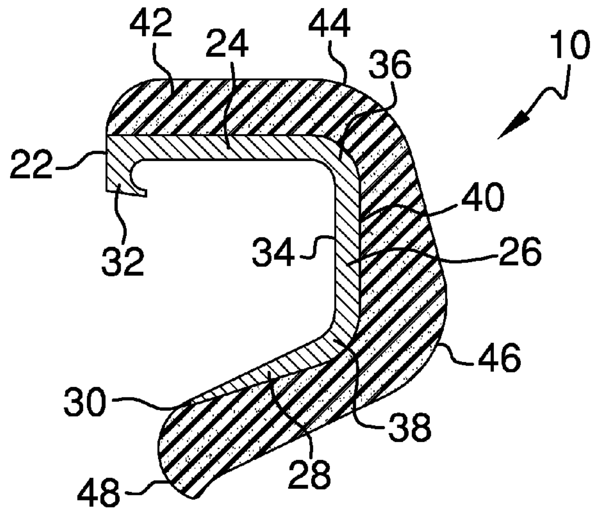
FIG. 3 is a cross-section view taken along the line 3-3 of FIG. 1.

A heel 48 is disposed at a lower extremity of the outward portion 42, said heel 48 protruding from the bracket 20 second end 30 and configured to abut a gutter 70 exterior 76 when the gutter guard device 10 is moved to the engaged position (see FIGS. 2 and 3).

Thusly, when the present gutter guard device 10 is releasably engaged with an extant gutter 70 (as shown in FIG. 4), the present gutter guard device 10 is useable to securely position a ladder 72 against said gutter 70 for access to an adjacent roof, and the present gutter guard device 10 distributes the pressure exerted by the ladder 72 across the gutter 70 whereby the gutter 70 is protected from damage as a person or persons ascend the ladder 72.

In the preferred embodiment herein disclosed, the bracket 20 is manufactured from aluminum with the following dimensions: the bracket 20 is intended to be approximately 66 cm (26 inches) in length, the first piece 24 to be 3.8 cm (1.5 inches) from the first edge 22 to the first bend 36, the second piece 26 to be 3.8 cm (1.5 inches) from the first bend 36 to the second bend 38, and the third piece 28 tapered to the second edge 30 and configured that the heel 48 of the outward portion 42 abut the gutter 70 exterior 76 when the gutter guard device 10 is releasably engaged with a gutter.

What is claimed is:

1. A gutter guard device for releasably fastening to a gutter comprising:

an elongate, curved bracket configured to releasably engage with an extant gutter, the bracket comprising:
- a first edge;
- a first piece disposed from the first edge;
- a second piece disposed at approximately 90 degrees with respect to the first piece;
- a third piece disposed at more than 90 degrees with respect to the second piece, the third piece disposed at an oblique angle relative the second piece and tapering to a second edge;
- a hooked portion disposed upon the first edge, said hooked portion disposed to releasably engage with an extant lip disposed upon said extant gutter;
- an interior side disposed upon the bracket, said interior side configured to mesh with an extant gutter exterior when the hooked portion is releasably engaged with the gutter lip, and the gutter guard device is moved to an engaged position;
- an exterior side disposed upon the bracket, said exterior side disposed outfacing from the gutter when the gutter guard device is moved to the engaged position;
- a first bend of approximately 90 degrees disposed between the first piece and the second piece;
- a second bend disposed obliquely between the second piece and the third piece;

a rubberlike outward portion disposed upon the exterior side, said outward portion disposed in continuous contact with the exterior side of the bracket first piece, said outward portion disposed divergently atop the second piece whereby the outward portion thickens towards the bracket third piece, the outward portion further disposed in continuous contact with the bracket third piece;

a heel disposed at a lower extremity of the outward portion, said heel protruding from the bracket second end and configured to abut a gutter exterior when the gutter guard device is moved to the engaged position;

wherein the interior side conforms with the exterior of a gutter when the hooked portion is releasably engaged with the lip of said gutter and the gutter guard device is moved to an engaged position.

2. The gutter guard device of claim 1 wherein the bracket is made of aluminum and the outward portion is made of a polymeric and alternately rubberlike material.

3. The gutter guard of claim 2 wherein the bracket is approximately 66 cm (26 inches) in length, the first piece is approximately 3.8 cm (1.5 inches) between the first edge and the first bend and the second piece is approximately 3.8 cm (1 and a half inches) between the first bend and the second bend.

* * * * *